United States Patent
Kipnis et al.

(10) Patent No.: US 10,469,266 B2
(45) Date of Patent: Nov. 5, 2019

(54) SIGNATURE METHOD AND SYSTEM

(71) Applicant: Cisco Technology, Inc., San Jose, CA (US)

(72) Inventors: Aviad Kipnis, Efrat (IL); Erez Waisbard, Ramat Gan (IL); Eliphaz Hibshoosh, Tel Aviv (IL)

(73) Assignee: Cisco Technology, Inc., San Jose, CA (US)

( * ) Notice: Subject to any disclaimer, the term of this patent is extended or adjusted under 35 U.S.C. 154(b) by 184 days.

(21) Appl. No.: 15/595,980

(22) Filed: May 16, 2017

(65) Prior Publication Data

US 2018/0102903 A1    Apr. 12, 2018

(30) Foreign Application Priority Data

Oct. 6, 2016 (IL) .......................................... 248237

(51) Int. Cl.
*H04L 9/32*    (2006.01)
*H04L 9/08*    (2006.01)

(52) U.S. Cl.
CPC .......... *H04L 9/3247* (2013.01); *H04L 9/0819* (2013.01); *H04L 9/0861* (2013.01); *H04L 9/3218* (2013.01); *H04L 9/3236* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 6,292,897 B1 | 9/2001 | Gennaro et al. |
| 6,311,271 B1 | 10/2001 | Gennaro et al. |
| 7,340,602 B2 | 3/2008 | Serret-Avila |
| 7,574,605 B2 | 8/2009 | Tanimoto et al. |

(Continued)

FOREIGN PATENT DOCUMENTS

| | | |
|---|---|---|
| JP | 5183401 | 4/2013 |
| WO | 1999040702 A1 | 8/1999 |

OTHER PUBLICATIONS

Bernhard, David et al.; How Not to Prove Yourself:Pitfalls of the Fiat-Shamir Heuristic and Applications to Helios (2012).

(Continued)

*Primary Examiner* — Lynn D Feild
*Assistant Examiner* — Vadim Savenkov (57) ABSTRACT

In one embodiment, a first signature template is received, the first signature template being one of a signature template of a first message or a null template, the first signature template comprising at least the following fields: an aggregation depth field, a message identifier, one of the first message or a result of applying a one way hash function to the first message, a bit vector, an aggregated square random integer mod N, a signature of the first message. A second signature template is created based on the first signature template, the second signature template created as follows: increment the aggregation depth of the first signature template, determine a unique message identifier for a second message, determine a second bit vector, determine an second aggregated square random integer mod N, and calculate a new signature for the second message. Related methods, apparatus, and systems are also disclosed.

20 Claims, 5 Drawing Sheets

(56) References Cited

U.S. PATENT DOCUMENTS

| | | | |
|---|---|---|---|
| 7,890,763 B1* | 2/2011 | Law | G06Q 20/401 |
| | | | 705/75 |
| 7,979,706 B1* | 7/2011 | Case | H04L 9/3247 |
| | | | 713/170 |
| 8,078,877 B2 | 12/2011 | Cheon | |
| 8,255,691 B2 | 8/2012 | Yi et al. | |
| 8,285,996 B2 | 10/2012 | McCullagh et al. | |
| 2005/0050332 A1 | 3/2005 | Serret-Avila et al. | |
| 2007/0028114 A1* | 2/2007 | McCullagh | H04L 9/3073 |
| | | | 713/176 |
| 2008/0150702 A1* | 6/2008 | Neill | H04L 9/3066 |
| | | | 340/10.42 |
| 2009/0327735 A1* | 12/2009 | Feng | H04L 9/0891 |
| | | | 713/180 |

OTHER PUBLICATIONS

Boneh, Dan et al.; Aggregate and Verifiably Encrypted Signatures from Bilinear Maps (2003).
Camenisch, Jan et al.; Batch Verification of Short Signatures (2007).
Cheon, Jung Hee et al.; A New ID-Based Signature with Batch Verification (2004), eprint.Iacr.
Ferrara, Anna Lisa et al.; Practical Short Signature Batch Verification (2009), Springer.
Gentry, Craig et al.; Identity-Based Aggregate Signatures (2006), Springer.
Goldwasser, Shafi: On the (IN)Security of the Fiat-Shamir Paradigm (2003), Proceedings of the 44th Annual IEEE Symposium on Foundations of Computer Science.
Struik, René; Speed-Ups of Elliptic Curve-Based Schemes, IETF-78, Maastricht, The Netherlands, Jul. 25-30, 2010.
Kim, Kitae et al.; Batch Verification and Finding Invalid Signatures in a Group Signature Scheme, In International Journal of Network Security, vol. 13, No. 2, pp. 61-70, Sep. 2011.
Bellare M., Garay J.A., Rabin T. (1998) Fast batch verification for modular exponentiation and digital signatures. In: Nyberg K. (eds) Advances in Cryptology—Eu Rocrypt'98. Eu Rocrypt 1998. Lecture Notes in Computer Science, vol. 1403. Springer, Berlin, Heidelberg (Year: 1998).
Lim C.H., Lee P.J. (1995) Server(ProverlSigner)-Aided Verification of Identity Proofs and Signatures. In: Guillou L.C., Quisquater JJ. (eds) Advances in Cryptology—Eu Rocrypt '95. Eu Rocrypt 1995. Lecture Notes in Computer Science, vol. 921. Springer, Berlin, Heidelberg (Year: 1995).
Yoon H., Cheon J.H., Kim Y. (2005) Batch Verifications with ID-Based Signatures. In: Park C., Chee S. (eds) Information Security and Cryptology—ICISC 2004. ICISC 2004. Lecture Notes in Computer Science, vol. 3506. Springer, Berlin, Heidelberg (Year: 2005).
Bellare, M., Namprempre, C. & Neven, G. J Cryptol (2009) Security Proofs for Identity-Based Identification and Signature Schemes Journal of Cryptology Jan. 2009, vol. 22, Issue 1, pp. 1-61 (Year: 2009).
Gennaro, Rosario et al.; How to Sign Digital Streams; revised version Feb. 24, 1998.
Golle, Phillippe et al.; Authenticating Streamed Data in the Presence of Random Packet Loss; In NDSS, vol. 1, pp. 13-22, 2001.
Perrig, A. et al.; Timed Efficient Stream Loss-Tolerant Authentication (TESLA): Multicast Source Authentication Transform Introduction; TESLA RFC4082; The Internet Society, Jun. 2005.
Sridevi, J. et al.; Efficient Multicast Packet Authentication Using Digital Signature; Proceedings published by International Journal of Computer Applications (IJCA) International Conference on Emerging Technology Trends (ICETT) 2011.
O. Dagdelen, et al., "The Fiat-Shamir Transformation in a Quantum World", In: Sako K., Sarkar P. (eds) Advances in Cryptology—ASIACRYPT 2013. ASIACRYPT 2013. Lecture Notes in Computer Science, vol. 8270. Springer, Berlin, Heidelberg, 30 pages.
D. Bernhard, et al., "How not to Prove Yourself: Pitfalls of the Fiat-Shamir Heuristic and Applications to Helios", In: Wang X., Sako K. (eds) Advances in Cryptology—ASIACRYPT 2012. ASIACRYPT 2012. Lecture Notes in Computer Science, vol. 7658. Springer, Berlin, Heidelberg, 26 pages.
Abstract of "On the Insecurity of the Fiat-Shamir Signatures with Iterative Hash Functions", In: Pieprzyk J., Zhang F. (eds) Provable Security. ProvSec 2009. Lecture Notes in Computer Science, vol. 5848. Springer, Berlin, Heidelberg, 9 pages.

\* cited by examiner

SIGNATURE METHOD AND SYSTEM

TECHNICAL FIELD

The present disclosure generally relates to methods and systems for implementing digital signatures.

BACKGROUND

In many networks efficient use and testing of message authenticity is an important requirement to establish trust in the network. Often the network is comprised of many communicating (signing) nodes (devices/users) some of which are computationally-constrained such that the ability of those computationally-constrained nodes to sign and verify messages is greatly limited. The needs for efficient generation of signatures and for fast verification of the signed messages are critical to enhance message authenticity in the network.

Batch-verification of signed messages is useful, as a successful verification of a single signature ensures the authenticity of many messages. Conversely, a failed verification of a single message during batch-verification indicates that at least one message was ill-signed. In such a case, performing verification on each one of the batch verified messages enables pin-pointing the source of the rogue messages.

BRIEF DESCRIPTION OF THE DRAWINGS

The present disclosure will be understood and appreciated more fully from the following detailed description, taken in conjunction with the drawings in which.

BRIEF DESCRIPTION OF THE APPENDICES

The present invention will be understood and appreciated more fully from the following detailed description, taken in conjunction with the appendix in which:

Appendix A is description of a standard Fiat-Shamir signature method; and

Appendix B is a proof by induction of security of the present method.

DESCRIPTION OF EXAMPLE EMBODIMENTS

Overview

In one embodiment, a first signature template is received, the first signature template being one of a signature template of a first message or a null template, the first signature template comprising at least the following fields: an aggregation depth field, a message identifier, one of the first message or a result of applying a one way hash function to the first message, a bit vector, an aggregated square random integer mod N, a signature of the first message. A second signature template is created based on the first signature template, the second signature template created as follows: increment the aggregation depth of the first signature template, determine a unique message identifier for a second message, determine a second bit vector, determine an second aggregated square random integer mod N, and calculate a new signature for the second message. Related methods, apparatus, and systems are also disclosed.

Example Embodiment

Figure 1:
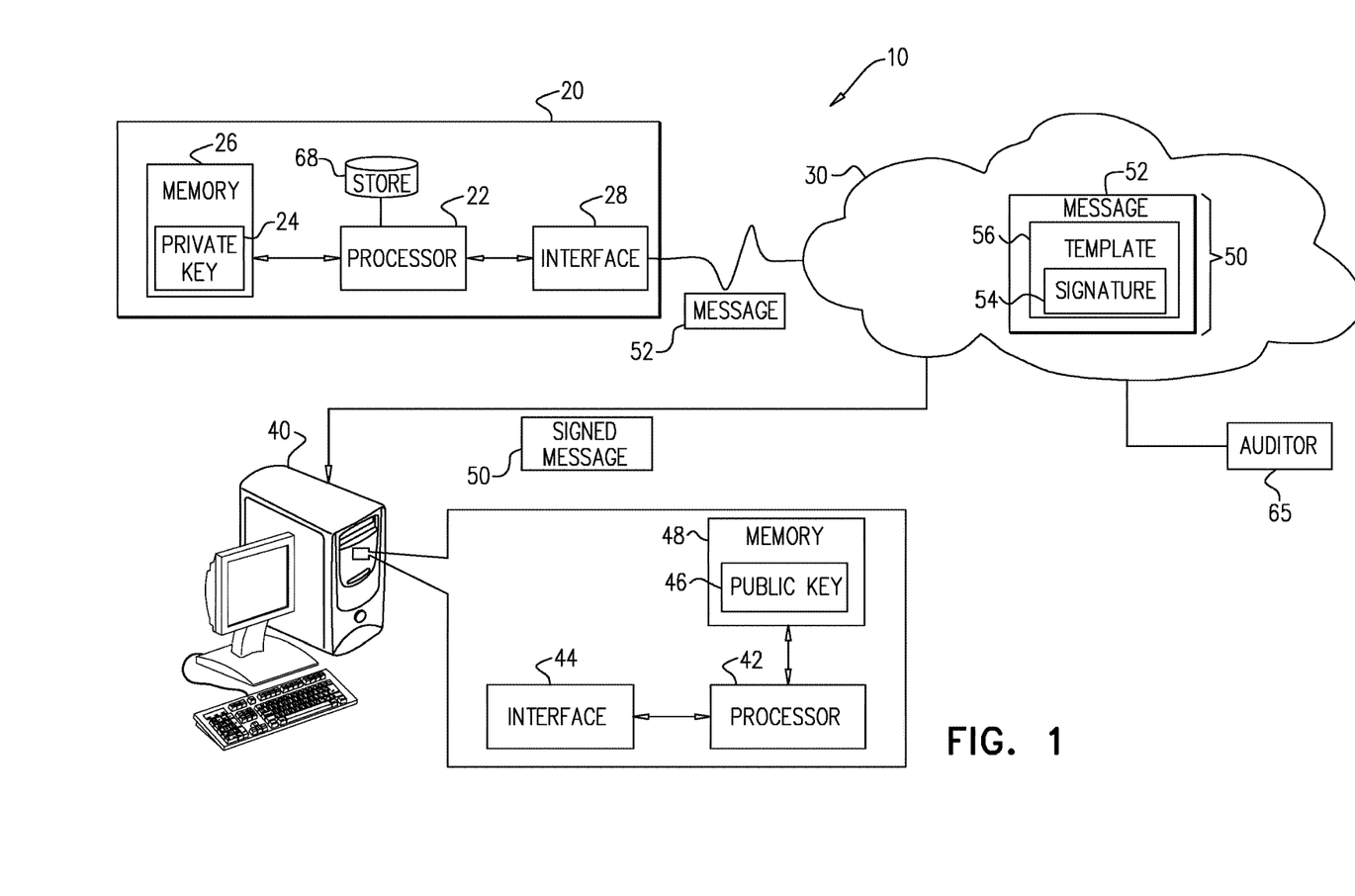
FIG. 1 is a block diagram that schematically illustrates a data communication system in which messages are authenticated using a public-key signature, in accordance with an embodiment of the present disclosure.

Reference is now made to FIG. 1, which is a block diagram that schematically illustrates a data communication system in which messages are authenticated using a public-key signature, in accordance with an embodiment of the present disclosure. The system for digitally signing the message comprises a Fiat-Shamir-based signature scheme with efficient, aggregated-signature generation. Because of the need for efficient generation of signatures and for fast verification to enhance message authenticity in the network, the system provides for fast batch verification and batch identification. Under the signature system described herein, the signature of a given message reflects a particular batch (aggregated chain) of signatures of other messages. Successful verification of the (aggregated chain) signature of the given message, enables provably asserting:

the data authenticity of the given message; and that no rogue (ill-signed) signatures are present in the particular chain.

System 10 is shown and described herein for the sake of example, to illustrate a typical configuration in which such digital signatures may be used, but is not meant to limit the application of such signatures to the configuration described herein.

In the pictured embodiment, a signing device, such as a signer 20 transmits data over a network 30 to a receiving device 40. Receiving device 40 may comprise a general-purpose computer or other computing device, such as, but not limited to, a hand held computing device, such as a tablet or smart phone.

In the example shown in FIG. 1, a processor 22 in signer 20 generates a message 52 for transmission to receiving device 40. Processor 22 computes a signature 54 for message 52 using a private key 24 that is stored in a memory 26. The signature 54 is computed using a template 56, as will be explained below. The signer 20 then transmits signed message 50 (comprising the message 52, the signature 54, and the template 56) via an interface 28 over the network 30 to the receiving device 40. The signer 20 may be a device which is itself in contact with another device, such as a device which provides the template 56, as is described below.

The signed message 50 which is signed may comprise a result of a one way function, such as a hash function (e.g., SHA-1, MD2, etc.), of the (unsigned) message 52. In cases where the message 52 is a large message comprising a large number of bits, the hash of the message 52 will typically be signed instead of the message 52. The distinction between a large number of bits and a small number of bits will be system dependent. For example, a video file, which may be considered a "large file", may be a file several gigabytes in size, while an MP3 audio file, which may be considered a "small file", may be a file less than 5 megabytes in size. Since the hash of the message is a unique value for the bit value of the message, the signature 54 will still be unique for the message 52. Accordingly, it is assumed below that the message, msg will be hashed by a hash function, h, so that MSG=h(msg), and MSG will be signed (the usage of "MSG", "msg", and "h(msg)" here is meant to be local, for this particular example, and without bearing on the description below).

A second processor 42 associated with the receiving device 40 receives signed message 50 via a second interface 44. The second processor 42, uses a public key 46, which is stored in a second memory 48 (used by the second processor 42) in order to verify the signature 54 of the message. Accordingly, the receiving device 40 may be referred to, herein below, as the "verifier".

Typically, both the processor 22 and the second processor 42 comprise general-purpose computer processors, which may be programmed in software to carry out the functions that are described herein. The software may be downloaded to the either of the processors in electronic form, over a network, for example. Alternatively or additionally, the software may be provided on tangible, non-transitory storage media, such as optical, magnetic, or electronic memory media. Further alternatively or additionally, some or all of the described processing functions may be performed by special-purpose or programmable digital logic circuits.

As noted above, FIG. 1 shows a certain configuration in which the signature scheme described herein may be applied. The same scheme may be applied in signing messages for authentication transmitted over a network. For the sake of convenience and clarity, the embodiments and claims herein refer to computation of a signature over a message, but the term "message" should be understood, in the context of the present patent application and in the claims, as referring to any sort of data that is amenable to signature by the present scheme.

An auditor 65, which may be thought of as a computerized system administrator, is also present on the network 30. The auditor 65 is a trusted third party which will receive a copy of the template 56 of all signed messages. That is to say that at the time when the signer 20 transmits the signed message 50 (comprising the message 52, signature 54, and the template 56) via an interface 28 over network 30 to the receiving device 40, the signer 20 also transmits the template 56 to the auditor. When the signer 20 needs a template in order to sign a message, such as message 52, the signer 20 may request a template from the auditor 65. The auditor 65 provides templates, such as template 56, to the signer 20. In other words, the auditor 65 both aggregates templates (e.g. template 56) used by signers (e.g. signer 20) and distributes templates (e.g. template 56) for use by signers (e.g. signer 20).

In some embodiments, the auditor 65 may be implemented locally on each of a plurality of signers 20. In such a case, each auditor 65 will receive templates, such as template 56, from the network and store, in an internal storage 68 on the signer 20, the templates being intended for use when the signer 20 needs a template 56 for signing a message 52. Additionally each auditor 65 may periodically perform full verification (as described below) on messages which exceed some threshold. For example, once a chain of signed messages exceeds ten messages in length (as discussed below, with reference to FIG. 2), every fourth message may undergo full verification. Also, in a star type network configuration, where a central node mediates all communication among other nodes, the auditor 65 may be disposed in the central node of the star network.

A successful verification of only a subset of all messages signed according to embodiments described herein in a network provably assures, with a desired level of confidence, that no ill-signed messages have been injected into the network. Conversely, if one or more of the messages fails verification, the presence of rogue signatures indicates that the network is apparently compromised. The presence of signatures which fail verification may serve as a trigger to some corrective action based, in part, on the identification of where the rogue signature was introduced. Accordingly, if a signature received by the receiving device 40 may undergo full verification, as instructed by the auditor 65.

Further, a feature of the system 10 is that the (aggregated) signature of any message maintains its size; it does not grow with the number of signatures (of different signers and their respective messages) which are reflected in the signature.

For efficient processing, the processor 22 may comprise dedicated hardware logic circuits, in the form of an application-specific integrated circuit (ASIC), field programmable gate array (FPGA), or full-custom integrated circuit, or a combination of such devices. Alternatively or additionally, some or all of the functions of the processor 22 may be carried out by a programmable processor, such as a microprocessor or digital signal processor (DSP), under the control of suitable software. The software may be downloaded to the processor in electronic form, over a network, for example. Alternatively or additionally, the software may be stored on tangible storage media, such as optical, magnetic, or electronic memory media. The second processor 42 may similarly be implemented in either hardware or software or a combination of hardware and software components of the types described above.

Figure 2:
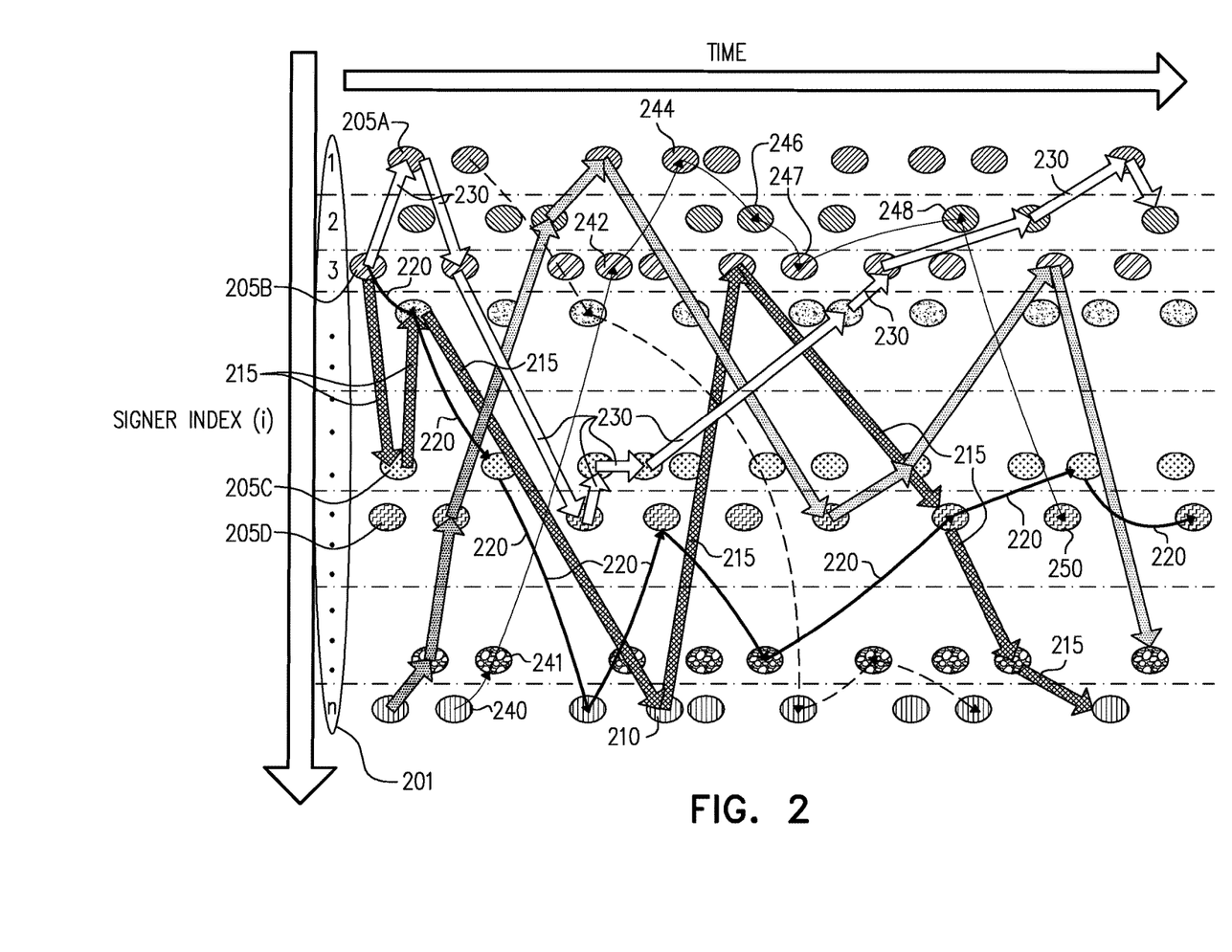
FIG. 2 is a depiction of a network with chains of messages whose intra-chain signatures are aggregated in accordance with embodiments of the public-key signature system of FIG. 1.

Reference is now made to FIG. 2, which is a depiction of a network with chains of messages whose intra-chain signatures are aggregated in accordance with embodiments of the public-key signature system of FIG. 1. As noted above, when a signer generates a signature 54 (FIG. 1) for a message 52 (FIG. 1) to be signed, the signer uses the private key 24 (FIG. 1), the message 52 (FIG. 1) to be signed, and a valid template 56 (FIG. 1). The template 56 (FIG. 1) comprises information concerning a previously signed message and the signer of its previously signed message. Once used for signing, the template 56 (FIG. 1) may be made available for use by the next signer for signing the next message to be signed. FIG. 2 shows various signed messages 205A, 205B, 205C, 205D, etc., depicted as ovals. In order to prevent FIG. 2 from becoming overly complicated, not every signed message is given a reference number. Messages of particular interest for the purpose of the present discussion hereinafter will be provided a reference number. FIG. 2 illustrates that the various users (identified by a signer index value 201, i) have signed various messages over time.

A message, such as message 205B may be uniquely identified by its source (i.e. the index value, i, of the user where the message originated and was signed) and its time stamp (i.e. typically the time and date when a particular message was signed). It is also appreciated that the unique identification information for a particular message (e.g. 205A, 205B, 205C, and so forth) typically does not indicate the message's destination. It is also appreciated that, in principle, there is no limitation to the nature of the message, in that any information which can be expressed as a string of bits and bytes may be signed according to embodiments of the signature method described herein. It is further appreciated that the information concerning a previously signed message and its signer, used in signing a later message, typically will not provide the signer of the later message with useful information about the previously signed message. By way of example, information pertaining to previously signed message 205B is not available in any useful form to a signer of message 205C, because of the one-way nature of the hash function used in generating the signature, as well as the difficulty presented by the discrete logarithm problem, as will be apparent to a person skilled in the art, and based on the discussion below. It is also noted that a message and its signature might be in more than one chain of messages. By way of example, message 205B is involved in chains 215, 220, and 230.

Some chains of messages in FIG. 2 undergo full verification of their last member. These chains are indicated in FIG. 2 as 2-dimensional arrows (having length and width), such as chains 215 and 230. Such chains may be only a small fraction of all of the chains in the network. However, when a member of such a chain undergoes full verification, every message prior to that member of the chain has been verified. Full verification typically involves the auditor 65 of FIG. 1 verifying the last message of the chain, and thereby verifies every message back to the first message of the chain. Other chains of messages in FIG. 2, such as chain 220, do not undergo full verification. Such chains typically comprise the majority of chains in the network. Such chains are indicated in FIG. 2 as one dimensional arrows (having length and minimal width). As will be explained below, prior to signing a message, the signer 20 (FIG. 1) will perform a template validity test. If the tested template fails the template validity test, the signer 20 will not use the failed template, and the auditor 65 may be notified, so that the auditor is able to perform full verification of the chain of messages which generated the template which failed the template validity test.

Figure 3:
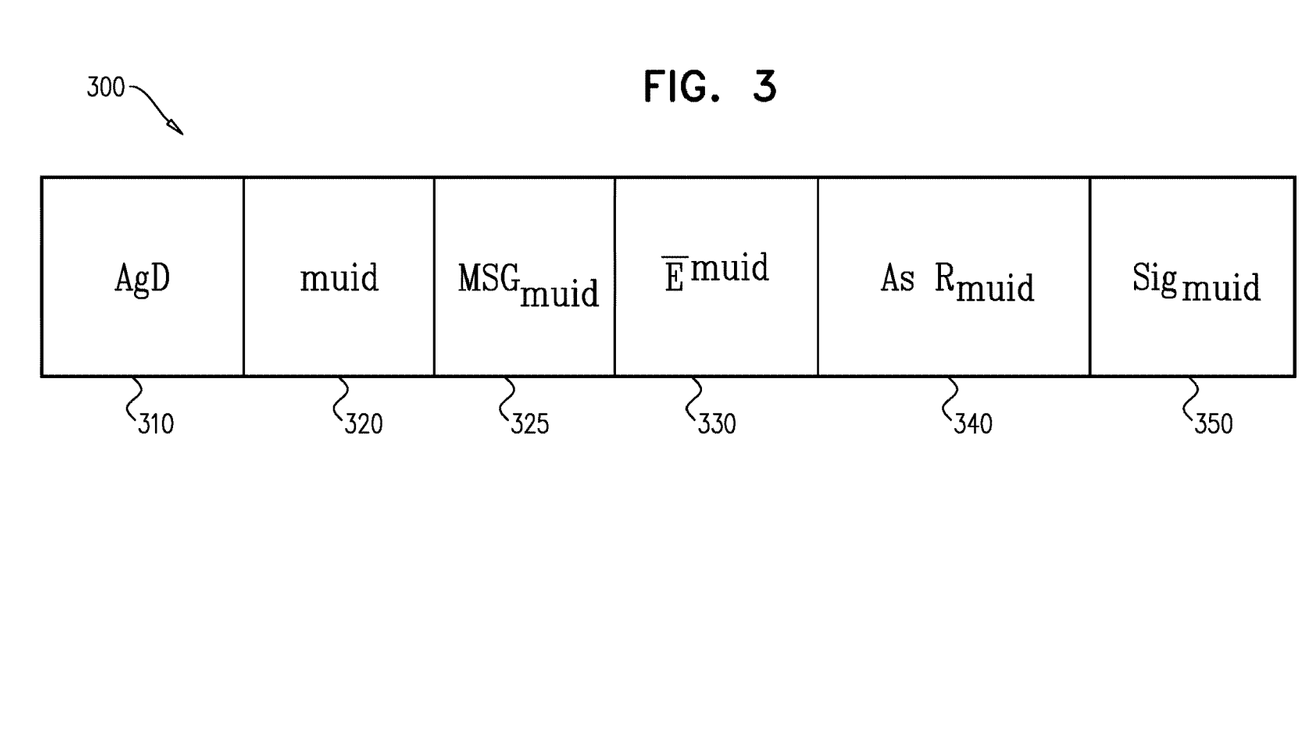
FIG. 3 is a block diagram depicting an exemplary template for use in the public-key signature system of FIG. 1.

Reference is now additionally made to FIG. 3, which is a block diagram depicting an exemplary template 300 for use in the public-key signature system of FIG. 1. As noted above, when a signer generates a signature for a message to be signed, the signer uses a private key, the message to be signed, and a valid template, such as template 300. The template 300 comprises information concerning a previously signed message and the signer of the previously signed message. A given template, such as template 300, may have a reflected history—aggregated information—of many signatures of various signers (nodes, i.e. signing devices and/or users). Specifically, the template 300 contains aggregated information (as will be explained below) concerning previously-signed messages, typically by different nodes. Accordingly, there is a recursive nature to the process of signing a given message with a given template, such as template 300, which implies that signing data from previous messages permeates and is reflected in the signature of current message. Templates are available to the signers via a server or a system manager, such as the auditor 65 of FIG. 1. Accordingly, and as depicted in FIG. 1, a newly formed signature 54 reflects the aggregated other previous messages and enables the subsequent efficient batch verification. In practice, the signer picks an (aggregated) signature from some previous message, performs a quick test for its validity, and if it passes the test, the signer uses it to sign the message 52 (FIG. 1). It is appreciated that the selection of the template 300 and of the signature may be performed in a random or arbitrary fashion.

The exemplary template 300 of FIG. 3 comprises the following fields, described below in Table 1:

TABLE 1

| Variable/Symbol | Explanation |
| --- | --- |
| AgD 310 | Aggregation depth - an indication of how many signatures of messages previously signed by various signers are reflected in the current signature. By way of example, for message 250, messages 240, 241, 242, 244, 246, 247 and 248 were previously signed and will be reflected in the current signature. Accordingly, for message 250, AgD = 7. |
| Muid 320 | Message Unique Identifier of a signed message and its signer where a signer identity, SNRi, can be extracted from the muid 320. Muid may be a combination of the signer index, i, and the timestamp of the message. Note that in SNRi, i = an index value, where each signer in a chain of messages is identified by a unique index value. In FIG. 2, SNRi is indicated by the vertical axis, Signer Index(i) 201. |
| $MSG_{muid}$ 325 | The message identified by muid 320 or a hash value of the message, m: $M_{muid} = h(m)$ |
| $\overline{E}^{muid}$ 330 | A bit vector associated with the message to be signed, i.e. the message associated with ID muid. The calculation of $\overline{E}^{muid}$ 330 will be described below. |
| $AsR_{muid}$ 340 | The Aggregated square Random of the message $Msg_{muid}$ to be signed. The Aggregated square Random is an integer (Mod N). |
| $Sig_{muid}$ 350 | The signature of the message muid ($Sig_{muid}$). |

When there are no templates available, the signer uses an initial template (i.e. a "null template") provided by the auditor 65 (FIG. 1).

The null template has the same fields as the template 300 described above in Table 1. The values of the field in the null template are described below, in Table 2.

TABLE 2

| Variable/Symbol | Value of null template |
| --- | --- |
| AgD | 0 |
| muid | Undefined (i.e., may be set to any arbitrary value) |
| $MSG_{muid}$ | Undefined (i.e., may be set to any arbitrary value) |
| $\overline{E}^{muid}$ | Bit vector of L zeros, where L is a number of bits in the vector. |
| $AsR_{muid}$ | 1 |
| $Sig_{muid}$ | 1 |

It will be appreciated that the values of $AsR_{muid}$ and $Sig_{muid}$ have both been set to 1 as a matter of convenience, as the ensuing calculations are thereby simplified, as will be seen below. In principle, any integer values may be used for $AsR_{muid}$ and $Sig_{muid}$ except 0.

As was noted above, a previous message which is used as the basis for signing a current message will have been signed with a previous template. As such, the current message will, accordingly be signed with a different template provided by the auditor 65 (FIG. 1). The different template, DAST, whose fields have the prefix D associated with its fields, and whose DAgD>0; namely, DAST=[DAgD, DMSGdmuid, $\overline{DE}^{dmuid}$, DAsR$_{dmuid}$, DSig$_{dmuid}$].

As noted above, the signer has a signed index value, i, indicating the signer's position in the chain of signers, as discussed above with reference to FIG. 2. Accordingly, signer i selects or is given one of a different and possibly previous template, DAST, by the signer 20 (FIG. 1) and the associated message, DMSG, and performs a light Template Validity test, defined below. If the Template Validity test is passed, then the signer uses the parameters of DAST in signing the message associated with message unique ID, muid.

If the Template Validity test is failed, then the signer i may report the failure to the auditor 65 (FIG. 1).

Table 3, below, provides a list of terminology used herein.

muid=a combination of the signer identifier, i, and the current message identifier, as explained above in Table 1.

Signer i, (SNRi) selects a random integer r Mod N, i.e., 0<r<N, and computes the following parameters of CAST:

$$AsR_{muid} = (DAsR_{muid} \cdot r^2) \bmod N$$

$$\overline{E}^{muid} = M(\overline{DE}^{muid}, T, i), \text{ where:}$$

$$T = \text{HASH}(AsRmuid \| MSGmuid \| Z(\overline{DE}^{muid}, i))$$

$Sig_{muid} = (r \cdot DSIG_{muid} \cdot CF \bmod N)$ where CF, a correction factor is defined as follows:

$$CF = \Pi_{j=1}^{L} CF_j \text{ where:}$$

$$CF_j = 1 \text{ if } \overline{E}_j^{muid} = \overline{DE}_j^{dmuid};$$

$$CF_j = S_j \bmod N \text{ if } \overline{E}_j^{muid} = 1 \text{ \& } \overline{DE}_j^{dmuid} = 0; \text{ or}$$

$$CF_j = S_j^{-1} \bmod N \text{ if } \overline{E}_j^{muid} = 0 \text{ \& } \overline{DE}_j^{dmuid} = 1.$$

TABLE 3

| Term | Definition |
| --- | --- |
| SNRi | Signer/User/device/node identified by i; i = (1, 2, , , , , M), e.g., M = 300 Also referred to as: U; U' |
| muid; dmuid | Unique Identifier of a signed message and its signer where the signer identity SNRi can be extracted from it.; Different muid - that of a message and signer that was signed and is used by muid |
| AgD | Aggregation Depth (also referred to as "depth") indicating how many signatures of messages (by various signers) are reflected in the current signature, also referred to as the 'depth' of the signature |
| IDX(i, j) | (M × K) Index matrix, IDX(i, j) ∈ {1, 2, . . . , L}, e.g., L = 1000, K = 100; j = (1, , , , , K); (row i provides the set of distinct K indexes for SNRi; column j may have non-distinct values) |
| N | Public (system) modulus, a product of two secret large primes p and q |
| $\overline{E}^{muid}$; $\overline{E}_j^{muid}$ | Bit vector associated with message identified by MUID, also referred to as $E_U$; |
| $\overline{E}^{dmuid}$; $\overline{E}_j^{dmuid}$ | $j^{th}$ bit of the vector. $\overline{E}^{MUID} \in \{0, 1\}^L$, $\overline{E}_j^{MUID} \in \{0, 1\}$; As above for dmuid, also referred to as $E_{U'}$ |
| S; $S_j$ | Set of L random secret values in $Z_N^*$; $j^{th}$ element in set S |
| $S^{(i)}$; $S_j^{(i)}$ | A randomly selected subset of K values in S assigned by the auditor to SNRi as his set of secret signing keys; $j^{th}$ element in set $S^{(i)}$; $S_j^{(i)} = S_{IDX(i,j)}$, j = 1, , , , , K |
| V; $V_j$ | Set of L public values in $Z_N^*$; the $j^{th}$ element $(V_j \cdot S_j^2 = 1 \bmod N)$ |
| $MSG_{muid}$; $DMSG_{dmuid}$ | Message (or its hash) identified by muid; Different Message (or its hash) identified by dmuid, (also referred to as $M_U$; $M_{U'}$) |
| $Sig_{muid}$ | Signature field of $MSG_{muid}$ |
| $AsR_{muid}$; $DAsR_{dmuid}$; r | Aggregated square Random of $MSG_{muid}$, an integer Mod(n); Aggregated square Random of $DMSG_{muid}$ ($AsR = r^2 \cdot DAsR_{dmuid}$); Nonce used for muid signature |
| $CAST_{muid}$ | Current Aggregated Signature Template of $MSG_{muid}$ = [AgD, muid, $\overline{E}^{muid}$, $ASR_{muid}$, $Sig_{muid}$, $MSG_{muid}$, *hash($MSG_{muid}$)] *optional instead of $MSG_{muid}$ |
| $DAST_{dmuid}$ | A Different Aggregated Signature Template of $DMSG_{dmuid}$ = [DAgD, dmuid, $\overline{DE}^{dmuid}$, $DAsR_{dmuid}$, $DSig_{dmuid}$, $DMSG_{dmuid}$ *hash($DMSG_{dmuid}$)] used in generating CAST. *optional instead of $DMSG_{dmuid}$. |
| $Z(\overline{W}, i)$ | Operator Z zeroes certain elements of L bit vector W, such that $\overline{W}_{IDX(i,j)} = 0$; j = (1, . . . , K) |
| $M(\overline{W}, T, i)$ | Operator M modifies W only at specific locations defined by row i of IDX matrix (SNRi indices) with values defined by T, such that $\overline{W}_{IDX(i,j)} = T(j)$; j = (1, . . . , K) |
| $\overline{e}^{muid}(i)$; $\overline{e}_j^{muid}(i)$ | Vector derived from $\overline{E}^{muid}$ whose $j^{th}$ bit is $\overline{e}_j^{muid} = \overline{E}_{IDX(i,j)}^{muid}$, j = (1, . . . , K) |

If the null template is not used, then a new template CAST (Current Aggregated Signature Template) is created by the signer 20 (FIG. 1) on the received DAST for the current message as follows:

$$AgD = DAgD + 1$$

The signature template, CAST for message of $SNR_i$ has now been generated.

It is appreciated that S, and $S_j$ are a set of L secret values randomly selected from a field $Z^*_N$, $S_j$ being the $j^{th}$ element in set S. Accordingly, set S is the set from which the private key, comprising the plurality of selected elements $S_j$, is selected.

Rationale for Correction Factor, CF

When viewing the vector $\overline{E}^{muid}$ as part of message $MSG_{muid}$ the similarity to Fiat-Shamir Signature (see Appendix A) is apparent to those of skill in the art. (The message may be considered extended to include some previous-modified $\overline{E}^{muid}$).

The correction factor, CF is derived in order to satisfy the verification $\overline{E}^{muid}=\text{Hash}(\text{Sig}^2 \cdot V^{\overline{E}^{muid}} \mod N \| M)$. V is a set of L public values in $Z^*_N$.

The current signer of the message uses different signer template data than previous signers.

Thus, the previous signer has a vector E', which corresponds to the vector $\overline{E}^{dmuid}$ used by the current message such that $E'=(e'_1, \ldots, e'_j, e'_L)$ and R', Sig', such that, $R'^2=\text{Sig}'^2 \prod_{j=1}^{L} V_j^{e'_j}$ On the other hand, the current signer has: $E=(e_1, \ldots, e_j, \ldots e_L)$, $R(=r R')$, $\text{Sig}_{muid}$ (also referred to as "Sig"), such that, $R^2=(r R')^2=\text{Sig}^2 \prod_{j=1}^{L} V_j^{e_j}$ Since, by definition, $\text{Sig}_{muid}=r \cdot \prod_{j=1}^{L} CF_j \cdot \text{Sig}'$:

$R^2=r^2 R'^2=r^2 \cdot \prod_{j=1}^{L} CF_j^2 \cdot \text{Sig}'^2 \cdot \prod_{j=1}^{L} V_j^{e_j}$ should be satisfied.

Let $e_j=e'_j+\hat{e}_j$ and substitute above; then:

$$r^2 R'^2 = r^2 \cdot \prod_{j=1}^{L} CF_j^2 \cdot \left( \text{Sig}'^2 \cdot \prod_{j=1}^{L} V_j^{e'_j} \right) \cdot \prod_{j=1}^{L} V_j^{\hat{e}_j} \text{ thus}$$

$$r^2 R'^2 = r^2 \cdot \prod_{j=1}^{L} CF_j^2 \cdot (R'^2) \cdot \prod_{j=1}^{L} V_j^{\hat{e}_j} \text{ resulting in}$$

$$1 = \prod_{j=1}^{L} CF_j^2 \cdot \prod_{j=1}^{L} V_j^{\hat{e}_j} \text{ or}$$

$$CF_j = \sqrt{1/V_j^{\hat{e}_j}} = S_j^{\hat{e}_j}$$

Hence if $e_j=e'_j$ then $\hat{e}_j=0$ and $CF_j=1$
$e_j=1$ and $e'_j=0$ then $\hat{e}_j=1$ and $CF_j=S_j$
$e_j=0$ and $e'_j=1$ then $\hat{e}_j=-1$ and $CF_j=1/S_j$.

Template Validity Test (TVT) for Proof of Security by Induction

Before signer i (SNRi) uses DAST (generated by signer n) in signing the signer's message and generating a CAST, the signer or the signer's trusted agent performs a Template Validity Test (TVT) on DAST as a precondition for DAST's use. The TVT is as follows:

Let the signer of the DAST be SNRn (with a corresponding $d_{muid}$ field in DAST).

Calculate a K bit vector $U=\text{Hash}(\text{DAsR}_{dmuid} \| \text{DMSG}_{dmuid} \| Z(\overline{DE}^{dmuid}, n))$;

Test that $U(j)=\overline{DE}^{dmuid}(IDX(n,j))$, for all $j=1,2,\ldots, K$

If $U(j)=\overline{DE}^{dmuid}(IDX(n,j))$, for all $j=1,2,\ldots, K$ holds for all j, then the TVT is considered passed and DAST can be used.

A trusted third party (TTP), such as the auditor 65 (FIG. 1), may perform the TVT on DAST and securely deliver (e.g. DAST is protected so that it may not be tampered with modified en route) it as valid template to any signer.

Successful TVT is a sufficient condition for the security proof (by induction, refer to Appendix B) that successful verification of the last message in the batch ensures that all previous messages in the chain are properly signed.

Full Verification

As described above, the verifier receives the following from SNRi: the signature field of the message, $\text{Sig}_{muid}$; the aggregated square random of the message (an integer Mod (n), as noted elsewhere), $\text{AsR}_{muid}$; the message itself (or a hash thereof), $\text{MSG}_{muid}$; and the bit vector associated with the message, $\overline{E}^{muid}$.

Full verification for the message of SNRi comprises two steps:

STEP 1: Calculate $X=\text{Sig}_{muid}^2 \prod_{j=1}^{L} V_j^{\overline{E}_j^{muid}} \mod N$ and verify that $\text{AsRmuid}=X$; if true proceed to step 2. Otherwise, verification failed.

STEP 2: As in Fiat-Shamir signature verification, calculate a K-bit vector $\text{SNRj}=\text{hash}(\text{AsR}_{muid} \| \text{MSG}_{muid} \| Z(\overline{E}^{muid}, i))$ and test if $\text{SNRj}=\overline{E}^{muid}(IDX(i,j))$, for all $j=1,2,\ldots, K$.

If both above tests, step 1 and step 2 are true, then:
The message $\text{MSG}_{muid}$ is valid, and;
all of the messages whose signatures are reflected in the received (aggregated) signature, $\text{Sig}_{muid}$, are valid.

Identification of Rogue Signatures

The following process is used for identification of a rogue signature and its origin, i.e., the point at which it was introduced.

If full verification fails, a verification test is repeated for each previous message in the chain until the verification test for a particular message passes the verification test. The point of the first instance of rogue signature injection is now known; i.e., the earliest incidence in the chain which fails the verification test is the first instance of a rogue signature. In some embodiments, the auditor 65 of FIG. 1 may store all signing secrets, thereby aiding the auditor 65 to identify other downstream rogue signatures in the chain.

Figure 4:
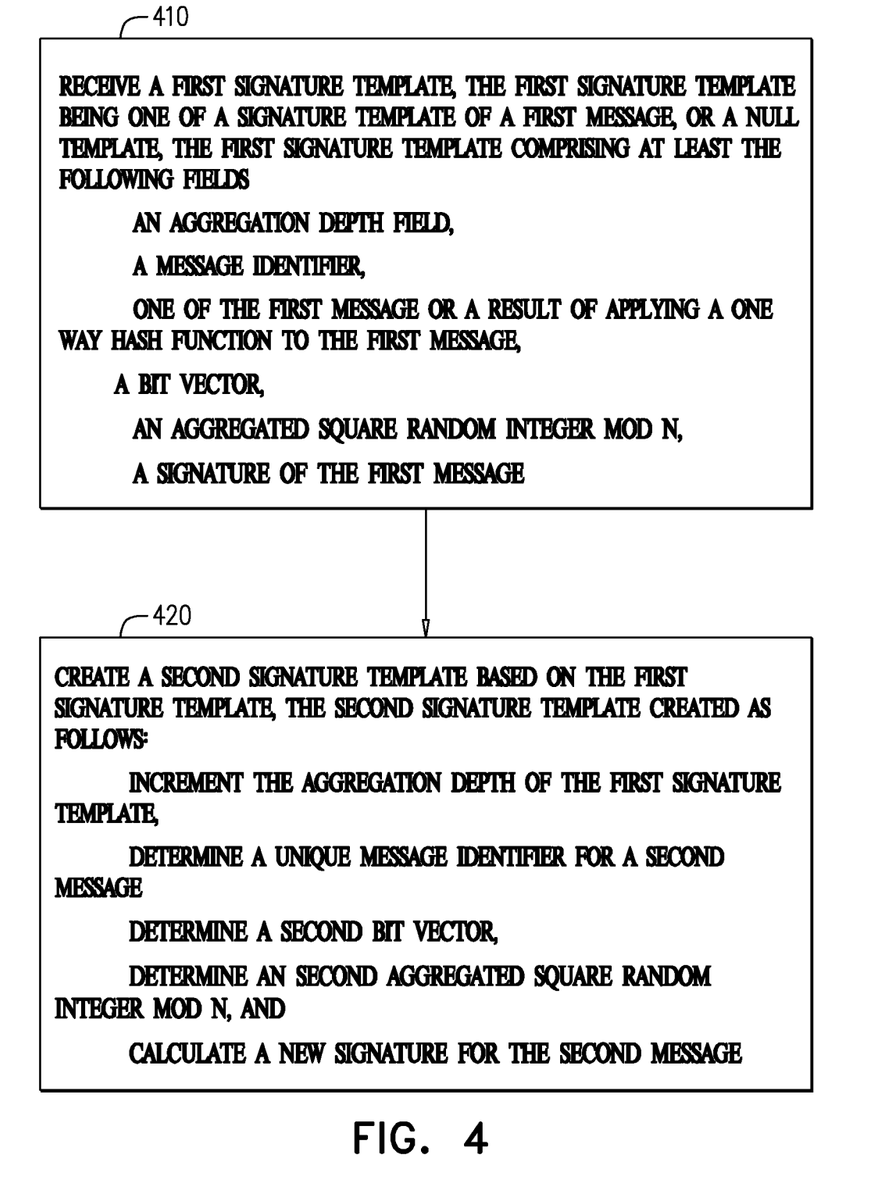
FIG. 4 is a flow chart diagram of a method for signing a message with the public-key signature of FIG. 1.

Reference is now made to FIG. 4, which is a flow chart diagram of a method for signing a message with the public-key signature of FIG. 1. Reference is also additionally made to FIGS. 1 and 3. At step 410, a first signature template is received from the auditor 65 at the interface 28, and sent to the processor 22. The first signature template is one of a signature template of a first message (the first message having been signed previously) or a null template (as described above, see Table 2). The first signature template or the null template comprises at least the following fields:
an aggregation depth 310;
a message identifier 320;
one of: the first message or a result of a one way hash function of the first message 325;
a bit vector 330;
an aggregated square random integer Mod N 340; and
a signature of the first message 350.

The fields in the first signature template or the null template are described above with reference to Tables 1 and 2.

At step 420, the processor 22 creates a second signature template based on the first signature template, the processor determining the following fields in the second signature template based on the first signature template:
an incremented aggregation depth of the first signature template;
a unique message identifier for a second message, which is a message to be signed;
one of the second message or a result of applying a one way hash function to the second message;
a second bit vector;
a second aggregated square random integer Mod N; and
a signature of the second message.

Figure 5:
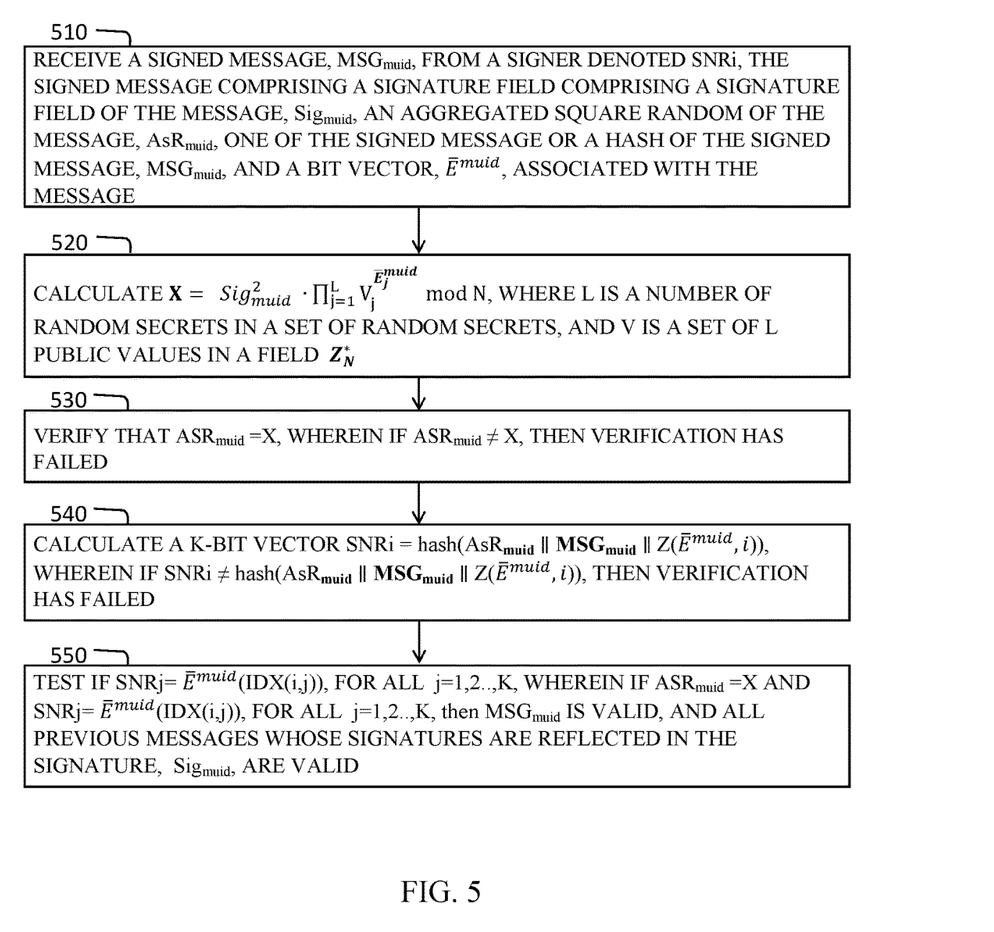
FIG. 5 is a flow chart diagram of a method for verifying a messaged signed with the public-key signature of FIG. 1.

Reference is now made to FIG. 5, which is a flow chart diagram of a method for verifying a messaged signed with the public-key signature of FIG. 1. Reference is also additionally made to FIG. 1. At step 510, the second interface 44 receives the signed message 50 from a signer (SNRi) 20. The signed message is passed to the second processor 42. The signed message comprises at least the following fields:
- a signature field of the signed message,
- an aggregated square random integer Mod N;
- one of the signed message or a result of applying a one way hash function to the signed message;
- and a bit vector associated with the message.

At step 520 the second processor 42 calculates $X = \text{Sig}_{muid}^2 \cdot \Pi_{j=1}^{L} V_j^{\overline{E}_j^{muid}}$ mod N, where L is a number of random secrets in a set of random secrets, and V is a set of L public values in a field $Z^*_N$. At step 530 the second processor verifies that $\text{AsR}_{muid} = X$, wherein if $\text{AsR}_{muid} \neq X$, then verification has failed. At step 540 the second processor 42 calculates a K-bit vector $\text{SNRi} = \text{hash}(\text{AsR}_{muid} \| \text{MSG}_{muid} \| Z(\overline{E}^{muid}, i))$, wherein $Z(\overline{W}, i)$ is an operator Z which zeros at least some elements of a bit vector W, of length L. If the K-bit vector SNRi does equal $\text{hash}(\text{AsR}_{muid} \| \text{MSG}_{muid} \| Z(\overline{E}^{muid}, i))$, then verification has passed. Otherwise verification has failed.

Finally, at step 550, the processor tests if $\text{SNRj} = \overline{E}^{muid}(\text{IDX}(i,j))$, for all j=1,2, . . . , K. If:

$$\text{AsR}_{muid} = X;$$

$$\text{SNRi} = \text{hash}(\text{AsR}_{muid} \| \text{MSG}_{muid} \| Z(\overline{E}^{muid}, i)); \text{ and}$$

$$\text{SNRj} = \overline{E}^{muid}(\text{IDX}(i,j)), \text{ for all } j=1,2,\ldots,K,$$

then all of the previous messages which are reflected in the signature (as discussed above, with reference to FIG. 2) are valid.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

APPENDIX A

Standard Fiat-Shamir Signature

The Signer has signing secret set of mod N values {Si} (i=1, . . . , 64) (e.g., N~2 kbits). The Signer's public set of Vi's satisfies $S_i^2 \cdot V_i = 1$ mod N.

For message M the Signer picks a random number R mod N, and computes: a K-bit (e.g., 64 bits) vector, $E = (e_1, e_2, \ldots e_{64}) = \text{Hash}(R^2 \| M)$ and $\text{Sig} = R \cdot \Pi_{i=1}^{64} S_i^{e_i}$ The Signer sends $[(e_1, e_2, \ldots e_{64}), \text{Sig}, M]$ to a Verifier.

The Verifier uses public {$V_i$}'s and verifies that received $(e_1, e_2, \ldots e_{64}) = \text{Hash}(\text{Sig}^2 \cdot \Pi_{i=1}^{64} V_i^{e_i} \text{ mod } N \| [M])$ The security provided by the standard Fiat Shamir signature scheme relies on finding {S} (i.e., the hardness of factoring N), and robustness of the hash being a one way function.

APPENDIX B

Proof by Security of the Present Method, by Induction

The signature Sig on a message M originated by user U together with bit vector E satisfies:

E(restricted to indexes of U)=hash
(Sig2·VE∥M∥zero(E on indexes of U))

Where V is the vector of inverses of the squares of the secrets.

The following is a proof by induction of security i.e., that passing full verification ensures that all other messages in the chain have been validly signed.

1. If the depth is 1 there is no previous information and validity of the signature is due to validity of Fiat-Shamir (FS) signature scheme.
2. Suppose U received a message $\underline{M}$ from user $\underline{U}$ with vector $\underline{E}$, signature $\underline{\text{Sig}}$, and $\underline{R}^2$, performed TVT and generated the signature Sig for message M together with $R^2$, and vector E. All the data: Sig, $R^2$, M are sent to the verifying entity. It is assumed that the signature was correctly verified, i.e., the equality holds for: $R^2 = \text{Sig}^2 \cdot V^E$, and E(restricted to indexes of U)=hash $(\text{Sig}^2 \cdot V^E \| M \| \text{zero}(E \text{ on indexes of U}))$. Consider each of the vectors V, E split into two vectors, according to the indexes of U, denoted as, V|U and E|U, respectively; and according to the rest of the indexes (i.e., those that do not belong to U), denoted as, E|$\overline{U}$ and V|$\overline{U}$, respectively. The verification now satisfies: $R^2 = \text{Sig}^2 \cdot V^E$, and E|U=hash(Sig$^2 \cdot$(V|U)$^{(E|U)} \cdot$(V|$\overline{U}$)$^{(E|\overline{U})} \| M \| \text{zero}(E$ on indexes of U)). Due to the one way property of the hash function, it is concluded that the value: Sig$^2 \cdot$(V|U)$^{(E|U)} \cdot$(V|$\overline{U}$)$^{(E|\overline{U})}$ is determined before a result of the hash function is calculated. Since all the information in E|$\overline{U}$ is also an input to the hash function (as the values of E on the indexes of U were set to zero) it is concluded that the value (V|$\overline{U}$)$^{E|\overline{U}}$ is also determined before the hash is calculated. As a result it is concluded that the signer was able to calculate the modular square root of a value of the following form: $\alpha \cdot$(V|U)$^{E|U}$, where $\alpha$ is predetermined and the term $\alpha \cdot$(V|U)$^{E|U}$ contains exponent values that are determined only after the hash is calculated; here again an FS-like argument demonstrates that an attacker could not calculate the result of the hash function unless the attacker knows the square roots of both $\alpha$ and $\alpha \cdot$(V|U)$^{E|U}$ (note, the attacker can cheat with very small probability if the attacker can predict E|U before the result of the hash function is calculated). As a result, it is known that the signer of M knows the secrets belonging to the indexes of U, i.e. the signer is a valid signer therefore the signer is indeed signer U.

If U is valid it is assumed that the signer correctly followed the protocol and before signing message M, and conducted the quick validation test (TVT) of the message M, i.e., $\underline{E}|\underline{U}$=hash($\underline{R}^2 \| M \| \text{zero}(\underline{E}$ on indexes of U). In addition, the validity of the following relations is known:

$$\underline{R}^2 \cdot r^2 = R^2 \text{ (and U is a valid signer);} \quad (1)$$

$$R^2 = \text{Sig}^2 \cdot V^E \text{ (checked by the Verifier); Sig}^2 = \text{Sig}^2 \cdot r^2 \cdot [(\text{Secrets}|U)^2]^{(\hat{E}|U)} \text{ (the definition of the signature of U generated raised to the power of 2).} \quad (2)$$

Given that $V_i S_i^2 = 1 \mod N$, the last relation can be rewritten as:

$$\text{Sig}^2 = \text{Sig}^2 \cdot r^2 \cdot [(V^{-1}|U)]^{(\hat{E}|U)} \quad (3)$$

Substituting (1) in (2) yields:

$$\underline{R}^2 \cdot r^2 = \text{Sig}^2 \cdot V^E, \text{ and substituting (3) in (4) yields:} \quad (4)$$

$$\underline{R}^2 \cdot r^2 = \text{Sig}^2 \cdot r^2 \cdot [(V^{-1}|U)]^{(\hat{E}|U)} \cdot V^E \quad (5)$$

Dividing both sides by $r^2$ gives:

$$\underline{R}^2 = \underline{\text{Sig}}^2 \cdot [(V^{-1}|U)]^{(\hat{E}|U)} \cdot V^E, \quad (6)$$

It can now be shown that by definition of $\hat{E}$ the term $[(V^{-1}|U)]^{(\hat{E}|U)} \cdot V^E = V^{\underline{E}}$. For j index of U: $\hat{E}_j = 1$ if $\underline{E}_j = 0$ and $E_j = 1$ i.e. $V_j^{-1} \cdot V_j = 1 = V_j^{\underline{E}j}$, and, similarly, for j index of U: $\hat{E}_j = -1$ if $\underline{E}_j = 1$ and $E_j = 0$, i.e., $(V_j^{-1})^{-1} \cdot 1 = V_j = V_j^{\underline{E}j}$. Further, for index j of U: $\hat{E}_j = 0$ if $\underline{E}_j = E_j$ resulting in $(V_j^{-1})^0 = 1$ and $V_j^{\underline{E}i} = V_j^{\underline{E}j}$. Thus (6) can be rewriten as $\underline{R}^2 = \underline{\text{Sig}}^2 \cdot V^{\underline{E}}$ Knowing that user U conducted the quick validation test and verified that $\underline{E}|U = \text{hash} (\underline{R}^2 ||M|| \text{zero}(\underline{E} \text{ on indexes of } \underline{U})$, $R^2$ can be replaced by the value $\underline{\text{Sig}}^2 \cdot V^{\underline{E}}$ and accordingly: $\underline{E}|U = \text{hash} (\underline{\text{Sig}}^2 \cdot V^{\underline{E}} ||M|| \text{zero}(\underline{E} \text{ on indexes of } \underline{U})$ which is, in fact, the required (full) verification of the message $\underline{M}$.

Therefore, it is proven by induction that all the aggregated messages in the chain are correctly signed.

What is claimed is:

1. A method comprising:
   receiving a first signature template at a signing device, the first signature template being one of:
   a signature template of a first message, the first message having been signed previously; or
   a null template, the received first signature template comprising at least the following fields:
   an aggregation depth indicating how many signatures of previous messages are reflected in the received first signature template, the aggregation depth being set to zero in the null template;
   a message identifier which is unique to the first message, the message identifier being an arbitrary value in the null template;
   one of the first message or a result of a one way hash function of the first message, denoted $\text{MSG}_{muid}$, $\text{MSG}_{muid}$ being set to an arbitrary value in the null template;
   a bit vector, denoted $\underline{DE}^{muid}$, the bit vector being associated with the first message, the bit vector being populated with zeros in the null template;
   an aggregated square random, being an integer Mod N, N being a public modulus and product of two secret large primes, the aggregated square random denoted $\text{DAsR}_{muid}$, $\text{DAsR}_{muid}$ being a nonce to be used for signing the first message, $\text{DAsR}_{muid}$ being an integer not equal to zero in the null template; and
   a signature of the first message, the signature being denoted $\text{DSIG}_{muid}$, $\text{DSIG}_{muid}$ being an integer not equal to zero in the null template;
   creating a second signature template based on the first signature template, the creating comprising:
   incrementing the aggregation depth of the first signature template;
   determining a unique message identifier for a second message, the second message being a message to be signed;
   including one of: the second message; or a result of applying a one way hash function to the second message;
   determining a second bit vector, denoted $\overline{E}^{muid}$, the second bit vector being associated with the second message;
   determining a second aggregated square random, being an integer Mod N, denoted $\text{AsR}_{muid}$, for the message to be signed;
   calculating a new signature for the second message, the new signature being denoted $\text{Sig}_{muid}$; and
   transmitting the second signature template to a receiving device for verifying the second message.

2. The method according to claim 1 wherein $\text{AsR}_{muid} = (\text{DAsR}_{muid} \cdot r^2) \mod N$ for a random integer, r Mod N.

3. The method according to claim 1, wherein $\text{Sig}_{muid} = (r \cdot \text{DSIG}_{muid} \cdot CF \mod N)$, where CF is a correction factor.

4. The method according to claim 3, wherein the correction factor, CF, is:

$$CF = \Pi_j^L = 1 CF_j \text{ where:}$$

$$CF_j = 1 \text{ if } \overline{E}_j^{muid} = \overline{DE}_j^{dmuid};$$

$$CF_j = S_j \mod N \text{ if } \overline{E}_j^{muid} = 1 \text{ \& } \overline{DE}_j^{dmuid} = 0; \text{ or}$$

$$CF_j = S_j^{-1} \mod N \text{ if } \overline{E}_j^{muid} = 0 \text{ \& } \overline{DE}_j^{dmuid} = 1.$$

5. The method according to claim 1, wherein in the null template one or both of $\text{DAsR}_{muid}$ or $\text{DSIG}_{muid}$ are equal to 1.

6. The method according to claim 1, wherein $\overline{E}^{muid} = M(\overline{DE}^{muid}, T, i)$, and $T = \text{HASH}(\text{AsRmuid}||\text{MSGmuid}||Z(\overline{DE}^{muid}, i))$ wherein $Z(\overline{W}, i)$ is an operator Z which zeros elements of a bit vector W, of length L; and M is an operator which modifies $\overline{DE}^{muid}$ only at specific locations defined by row i of IDX matrix of signer i indices, denoted SNRi, with values defined by T, such that $\overline{W}_{IDX(ij)} = T(j); j = (1, \ldots, K)$.

7. The method according to claim 1, and further comprising using the first signature template to create the second signature template prior to performing a template validity test on the first signature template.

8. The method according to claim 7, wherein, if the first signature template passes the template validity test, the first signature template is used to perform the creating the second signature template.

9. The method according to claim 7, wherein, if the first signature template does not pass the template validity test, an auditor is notified.

10. The method according to claim 7, wherein the template validity test comprises calculating a K-bit vector $U = \text{Hash}(\text{DAsR}_{dmuid}||\text{DMSG}_{dmuid}||Z(\overline{DE}^{dmuid}, n))$, wherein $Z(\overline{W}, i)$ is an operator Z which zeros at least some elements of a bit vector W, of length L; and
   if $U(j) = \overline{DE}^{dmuid}(IDX(n,j))$, for all $j = 1, 2 \ldots, K$, where $IDX(n,j)$ is an n by j index matrix, then the template validity test has been passed, and otherwise, requesting a different signature template.

11. A method comprising:
   receiving a signed message, denoted $\text{MSG}_{muid}$, from a signer, the signer being denoted SNRi, the signed message comprising a signature template comprising at least the following fields:

a signature field of the signed message, denoted $\text{Sig}_{muid}$;

an aggregated square random of the signed message, denoted $\text{AsR}_{muid}$;

one of: the signed message; or a result of a one way hash function of the signed message, the one of the signed message or the result of a one way hash function of the signed message being denoted $\text{MSG}_{muid}$; and a bit vector associated with the signed message, denoted $\overline{\text{E}}^{muid}$;

calculating $X = \text{Sig}^2_{muid} \cdot \Pi_j^L = 1 V_{jE}^{muid}$ mod N, where L is a number of random secrets in a set of random secrets, and V is a set of L public values in a field $Z^*_N$;

verifying that $\text{AsR}_{muid} = X$, wherein if $\text{AsR}_{muid} \neq X$, then verification has failed;

calculating a K-bit vector $\text{SNRi} = \text{hash}(\text{AsR}_{muid} \| \text{MSG}_{muid} \| Z(\overline{\text{E}}^{muid}, i))$, wherein $Z(\overline{W}, i)$ is an operator Z which zeros at least some elements of a bit vector W, of length L; and testing if $\text{SNRj} = \overline{\text{E}}^{muid}(\text{IDX}(i,j))$, for all $j=1,2 \ldots, K$, wherein an (MxK) Index matrix denoted $\text{IDX}(i,j)$, $\text{IDX}(i,j) \in \{1,2,\ldots,L\}$;

and if $\text{AsR}_{muid} = X$ and $\text{SNRj} = \overline{\text{E}}^{muid}(\text{IDX}(i,j))$, for all $j=1,2 \ldots, K$, then identifying that $\text{MSG}_{muid}$ is valid, identifying that all previous messages whose signatures are reflected in signature $\text{Sig}_{muid}$, are valid, generating a new signature template, and transmitting the new signature template to a trusted third party for storing and distributing the new signature template.

12. The method according to claim 11, wherein if verification fails, the steps of:

calculating X;

verifying that $\text{AsR}_{muid} = X$;

calculating a K bit vector SNRi; and testing if $\text{SNRj} = \overline{\text{E}}^{muid}(\text{IDX}(i,j))$, are repeated for each previous message in a chain of messages preceding $\text{MSG}_{muid}$, until a valid message is found in the chain of messages preceding $\text{MSG}_{muid}$, and identifying this message as a first instance of rogue signature injection.

13. The method according to claim 12, wherein the method is performed by an auditor.

14. The method according to claim 11, wherein the received signature template comprises a field with a hash of the signed message.

15. The method according to claim 11, wherein the signature template is received from the trusted third party.

16. The method according to claim 11, wherein the signature template is received from an internal template storage.

17. A system comprising:

a hardware processor operative to receive a first signature template over an interface, the first signature template being one of:

a signature template of a first message, the first message having been signed previously; or a null template, the received first signature template comprising at least the following fields:

an aggregation depth indicating how many signatures of previous messages are reflected in the received first signature template, the aggregation depth being set to zero in the null template;

a message identifier which is unique to the first message, the message identifier being an arbitrary value in the null template;

one of the first message or a result of a one way hash function of the first message, denoted $\text{MSG}_{muid}$, $\text{MSG}_{muid}$ being set to an arbitrary value in the null template;

a bit vector, denoted $\overline{\text{DE}}^{muid}$, the bit vector being associated with the first message, the bit vector being populated with zeros in the null template;

an aggregated square random, being an integer Mod N, N being a public modulus and product of two secret large primes, the aggregated square random denoted $\text{DAsR}_{muid}$, $\text{DAsR}_{muid}$ being a nonce to be used for signing the first message, $\text{DAsR}_{muid}$ being an integer not equal to zero in the null template; and a signature of the first message, the signature being denoted $\text{DSIG}_{muid}$, $\text{DSIG}_{muid}$ being an integer not equal to zero in the null template;

the hardware processor operative to create a second signature template based on the first signature template, the second signature template comprising:

an incremented aggregation depth comprising the aggregation depth of the first signature template which has been incremented;

a unique message identifier for a second message, the second message being a message to be signed;

one of: the second message; or a result of applying a one way hash function to the second message;

a second bit vector, denoted $\overline{\text{E}}^{muid}$, the second bit vector being associated with the second message;

a second aggregated square random, being an integer Mod N, denoted $\text{AsR}_{muid}$, for the message to be signed;

a new signature for the second message, the new signature being denoted $\text{Sig}_{muid}$, which the hardware processor is operative to calculate; and transmitting the second signature template to a receiving device for verifying the second message.

18. The system of claim 17, wherein $\text{AsR}_{muid} = (\text{DAsR}_{muid} \cdot r^2)$ mod N for a random integer, r Mod N.

19. The system of claim 17, wherein $\text{Sig}_{muid} = (r \cdot \text{DSIG}_{muid} \cdot \text{CF}$ mod N), where CF is a correction factor.

20. The system of claim 19, wherein the correction factor, CF, is:

$\text{CF} = \Pi_j^L = 1 \text{CF}_j$ where:

$\text{CF}_j = 1$ if $\overline{\text{E}}_j^{muid} = \overline{\text{DE}}_j^{dmuid}$;

$\text{CF}_j = S_j$ mod N if $\overline{\text{E}}_j^{muid} = 1$ & $\overline{\text{DE}}_j^{dmuid} = 0$; or $\text{CF}_j = S_j^{-1}$ mod N if $\overline{\text{E}}_j^{muid} = 0$ & $\overline{\text{DE}}_j^{dmuid} = 1$.

\* \* \* \* \*